UNITED STATES PATENT OFFICE.

LEONHARD LEDERER, OF SULZBACH, OBERPFALZ, GERMANY.

COMPOUND SUITABLE AS LACQUER OR VARNISH.

No. 804,960. Specification of Letters Patent. Patented Nov. 21, 1905.

Application filed April 10, 1905. Serial No. 254,846.

*To all whom it may concern:*

Be it known that I, LEONHARD LEDERER, chemist, a subject of the German Emperor, residing at Sulzbach, Oberpfalz, Bavaria, Germany, have invented certain new and useful Improvements Relating to Solutions of Organic Compounds Suitable as Lacquers or Varnishes and for the Manufacture of Films and Filaments, of which the following is a specification.

The solutions of the nitro compounds of cellulose and of derivatives of such compounds are extensively used as collodion, zapon lacquer, and for other industrial purposes. The solvents chiefly employed for this purpose are acetone, alcohol, ether, and amyl acetate.

The present invention relates to the manufacture of similar and in some respects better products by using as a raw material acidilized cellulose—that is to say, acetyl cellulose and other fatty acid esters of cellulose—instead of the nitro compounds, whereby a product or composition is obtained which is eminently suitable as a waterproof coating for the impregnation of various materials and has a high insulating power. The number of solvents for this group of bodies is, however, very limited. The principal solvent hitherto employed is chloroform, which, however, has various well-known defects.

I have found that acetylene tetra-chlorid is a solvent more advantageous for this purpose. It boils at about 147° centigrade, dissolves acidilized cellulose easily, and yields solutions which are easy to manipulate and dry rapidly. The said solvent may be used either alone or in conjunction with other solvents.

Example: One part of acetyl cellulose is brought together with nine parts of acetylene tetra-chlorid and the mixture thoroughly stirred until the acetyl cellulose has been completely dissolved.

The solutions of acetylized cellulose in acetylene tetra-chlorid, either alone or in conjunction with other solvents, may be used also for the manufacture of filaments or threads by causing these solutions to pass from suitably-shaped orifices or molds into fixing or solidifying liquids in the known manner. Films, sheets, and other objects may be produced by causing a layer of the solution to evaporate.

Another advantageous use of acetylene tetra-chlorid consists in the production of resin lacquers or varnishes, (copal lacquer, &c.,) because the melting of the resins, which has hitherto been usual, may thereby be avoided, and clearer solutions may be obtained. The resin is simply mixed and stirred with the solvent until a complete solution has been produced.

What I claim is—

1. The process for the manufacture of solutions suitable as lacquers or varnishes and for other industrial purposes, which consists in dissolving a suitable organic compound in acetylene tetra-chlorid, substantially as described.

2. The process for the manufacture of solutions suitable as lacquers or varnishes and for other industrial purposes, which consists in dissolving suitable organic compounds in acetylene tetra-chlorid and another solvent of the said compound, substantially as described.

3. The process for the manufacture of solutions suitable as lacquers or varnishes and for other industrial purposes, which consists in dissolving an acidilized cellulose in acetylene tetra-chlorid, substantially as described.

4. The process for the manufacture of solutions suitable as lacquers or varnishes and for other industrial purposes, which consists in dissolving acetyl cellulose in acetylene tetra-chlorid, substantially as described.

5. A composition of matter consisting of a solution of acidilized cellulose in acetylene tetra-chlorid, substantially as described.

6. A composition of matter consisting of a solution of acidilized cellulose in acetylene tetra-chlorid and another solvent, substantially as described.

7. A composition of matter consisting of a solution of acetyl cellulose in acetylene tetra-chlorid, substantially as described.

8. A composition of matter consisting of a solution of acetyl cellulose in acetylene tetra-chlorid and another solvent, substantially as described.

In testimony whereof I have set my hand in presence of two subscribing witnesses.

LEONHARD LEDERER.

Witnesses:
WALTHER DOHT,
OSCAR BOCK.